United States Patent
Kuan et al.

(10) Patent No.: US 12,198,314 B2
(45) Date of Patent: Jan. 14, 2025

(54) IMAGE PROCESSING APPARATUS AND IMAGE PROCESSING METHOD FOR CONTRAST ENHANCEMENT

(71) Applicant: Realtek Semiconductor Corp., HsinChu (TW)

(72) Inventors: Yu-Hsuan Kuan, HsinChu (TW); Tsung-Hsuan Li, HsinChu (TW); Shih-Tse Chen, HsinChu (TW)

(73) Assignee: Realtek Semiconductor Corp., HsinChu (TW)

(*) Notice: Subject to any disclaimer, the term of this patent is extended or adjusted under 35 U.S.C. 154(b) by 429 days.

(21) Appl. No.: 17/720,280

(22) Filed: Apr. 13, 2022

(65) Prior Publication Data
US 2023/0162333 A1 May 25, 2023

(30) Foreign Application Priority Data

Nov. 23, 2021 (TW) .................. 110143451

(51) Int. Cl.
| | |
|---|---|
| G06K 9/00 | (2022.01) |
| G06T 5/20 | (2006.01) |
| G06T 5/94 | (2024.01) |
| G06T 7/11 | (2017.01) |
| G06T 7/90 | (2017.01) |

(52) U.S. Cl.
CPC .............. G06T 5/94 (2024.01); G06T 5/20 (2013.01); G06T 7/11 (2017.01); G06T 7/90 (2017.01)

(58) Field of Classification Search
CPC ........................................ G06T 5/70
See application file for complete search history.

(56) References Cited

U.S. PATENT DOCUMENTS

2008/0107360 A1* 5/2008 Yamashita ............... G06T 5/40
382/176
2010/0253852 A1* 10/2010 Fukuda .................. H04N 9/646
348/E9.037
(Continued)

FOREIGN PATENT DOCUMENTS

| CN | 104156921 A | * 11/2014 |
|---|---|---|
| CN | 104217666 A | 12/2014 |
| TW | I703872 B | 9/2020 |

OTHER PUBLICATIONS

Juan Gabriel Gomila Salas, and Jose Luis Lisani, Local Color Correction, p. 260-280, Volume Image Processing On Line, 1 (2011), Image Processing On Line, Spain. ,Sep. 27, 2011.
(Continued)

*Primary Examiner* — Gregory A Morse
*Assistant Examiner* — Owais Iqbal Memon
(74) *Attorney, Agent, or Firm* — Winston Hsu

(57) ABSTRACT

An image processing method includes: receiving an input image; performing a low-frequency image regulating operation to regulate the local intensity of the image of pixel unit(s) according to low-frequency information of the image of pixel unit(s) of the input image; performing a high-frequency image regulating operation to improve the details of the image of pixel unit(s) according to high-frequency information of the image of pixel unit (s) of the input image; and, generating an output image according to the input image, the low-frequency image regulating operation, and the high-frequency image regulating operation.

8 Claims, 11 Drawing Sheets

(56) References Cited

U.S. PATENT DOCUMENTS

2012/0306906 A1* 12/2012 Johnson .............. H04N 1/4072
　　　　　　　　　　　　　　　　　　　　　　　345/591
2020/0364828 A1* 11/2020 Chou ..................... G06T 5/20

OTHER PUBLICATIONS

Nathan Moroney, Local Color Correction Using NonLinear Masking, Jan. 1, 2000, p. 108-111, The Eighth Color Imaging Conference, Arizona, USA.
Vassilios Vonikakis et al., Fast centre-surround contrast modification, Mar. 1, 2008, p. 1-37, vol. 2(1):19-34, IET, Xanthi, Greece.
Yusuke Monobe et al., Dynamic Range Compression for Digital Video Camera Preserving High Visual Contrast by Spatially Variant Operator, Dec. 14, 2005, p. 22-31, vol. 45-1, J-STAGE, Japan.
Wojciech Jarosz, High-Dynamic-Range Photography and Tone Mapping, Sep. 1, 2015, p. 1-101, Computational Photography of Dartmouth University, USA.

* cited by examiner

IMAGE PROCESSING APPARATUS AND IMAGE PROCESSING METHOD FOR CONTRAST ENHANCEMENT

BACKGROUND OF THE INVENTION

1. Field of the Invention

The invention relates to an image processing scheme, and more particularly to an image processing apparatus and an image processing method for contrast enhancement.

2. Description of the Prior Art

Generally speaking, a conventional scheme may be able to regulate the brightness between different regions in an image to generate a user-preferred image. However, the conventional scheme cannot effectively improve or enhance the image details within the regions. The conventional scheme may merely adjust the Gaussian filter of the mask images, but has no additional parameters for other different adjustments. The conventional scheme is inflexible. The conventional scheme can only be used to regulate the brightness between different regions but its performance will be significantly limited and cannot effectively enhance the details and textures of objects in an image.

SUMMARY OF THE INVENTION

Therefore one of the objectives of the invention is to provide an image processing apparatus and an image processing method, to solve the above-mentioned problems.

According to embodiments of the invention, an image processing apparatus is disclosed. The image processing apparatus comprises a processing circuit which comprises a high-frequency portion processing unit and a low-frequency portion processing unit. The processing circuit is arranged for receiving an input image. The high-frequency portion processing unit is arranged for performing a high-frequency image portion regulating operation to improve image details of an image of an at least one pixel unit of the input image according to high-frequency information of the image of the at least one pixel unit. The low-frequency portion processing unit is arranged for performing a low-frequency image portion regulating operation to regulate local brightness of an image of an at least one pixel unit of the input image according to low-frequency information of the image of the at least one pixel unit. The processing circuit generates an output image according to the input image, the low-frequency image portion regulating operation, and the high-frequency image portion regulating operation.

According to the embodiments, an image processing method is further disclosed. The method comprises: receiving an input image; using a high-frequency portion processing unit to perform a high-frequency image portion regulating operation to improve image details of an image of an at least one pixel unit of the input image according to high-frequency information of the image of the at least one pixel unit; using a low-frequency portion processing unit to perform a low-frequency image portion regulating operation to regulate local brightness of an image of an at least one pixel unit of the input image according to low-frequency information of the image of the at least one pixel unit; and, generating an output image according to the input image, the low-frequency image portion regulating operation, and the high-frequency image portion regulating operation.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing an image processing method capable of adjusting or regulating brightness of each region in an input image as well as improving picture details of the input image. The image processing method can be used to receive an incoming input image such as frame or image picture, to brighten (or lighten) darker region(s) in the incoming input image, to darken (or dim) brighter region(s) in the incoming input image, and improve image picture details of the adjusted darker region(s) and the adjusted brighter region(s), to generate and output an output image.

Figure 1:
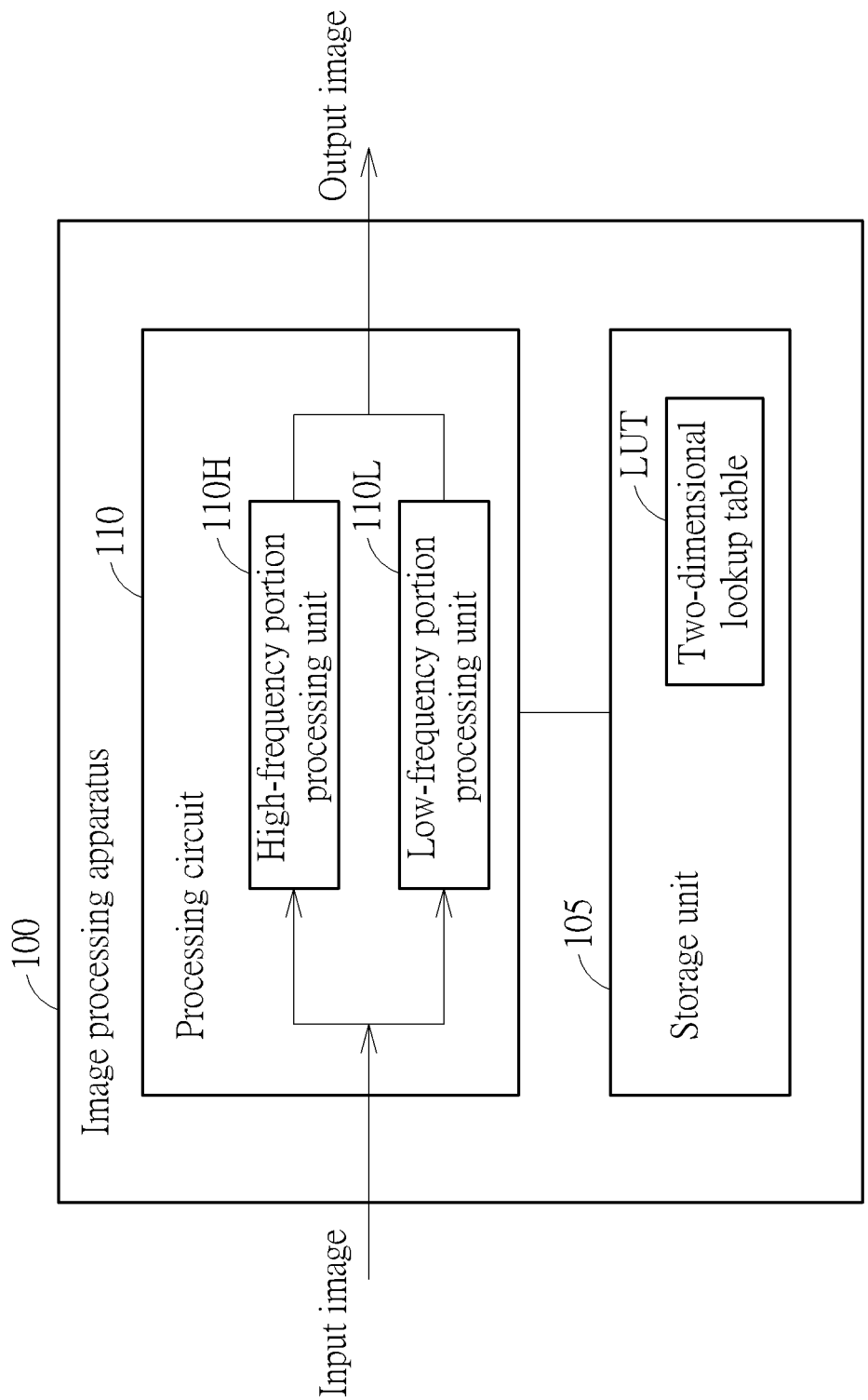
FIG. 1 is a block diagram of an image processing apparatus according to a preferred embodiment of the invention.

Please refer to FIG. 1. FIG. 1 is a block diagram of an image processing apparatus 100 according to a preferred embodiment of the invention. The image processing apparatus 100 comprises a storage unit 105 such as a memory unit or memory, and a processing circuit 110. The processing circuit 110 comprises a high-frequency portion processing unit 110H and a low-frequency portion processing unit 110L. In this embodiment, the image processing apparatus 100 (or processing circuit 110) is arranged to receive an input image, e.g. an input frame or an input picture image, and is arranged to perform at least one specific image processing operation upon images of at least one pixel unit in the input image to brighten darker regions, darken brighter regions, and improve image picture details of the darker and brighter regions. For performing the image regulation, a user can choose or select different curve equations and many different parameter values respectively for the high-frequency image portion and low-frequency image portion. It should be noted that the types of selected curve equations and different settings of the selected parameter values are not indented to be limitations of the invention.

The image processing operation for brightening darker regions and darkening brighter regions can be executed by the low-frequency portion processing unit 110L which is arranged for performing a low-frequency image portion regulating operation upon low-frequency information of the image of the at least one pixel unit of the input image. The low-frequency information corresponds to a regional or local brightness value of the image of the at least one pixel unit. For example, the local brightness value is an average brightness value generated by the image of the at least one pixel unit and the image(s) of neighboring pixel unit(s). Further, the image processing operation for improving image picture details can be executed by the high-frequency portion processing unit 110H which is arranged for performing a high-frequency image portion regulating operation upon high-frequency information of the image of the at least one pixel unit of the input image. The high-frequency information corresponds to a pixel value of the image of the at least one pixel unit divided by the local brightness value.

In other words, in this embodiment, the processing circuit 110 uses the high-frequency portion processing unit 110H to perform a high-frequency image portion processing upon the image(s) of the at least one pixel unit to improve the details of the images of the pixel units, and it also uses the low-frequency portion processing unit 110L to perform a low-frequency image portion processing upon the image(s) of the at least one pixel unit and neighboring image(s) to correspondingly brighten a darker image region in the input image and darken a brighter image region in the input image, so as to achieve a better brightness uniformity of the whole image of the input image, i.e. adjusting or tuning the average brightness of each of the image regions. It should be noted that, in another embodiment, the processing circuit 110 may use only the low-frequency portion processing unit 110L to perform the image adjusting without employing the high-frequency portion processing unit 110H. Alternatively, the processing circuit 110 may use only the high-frequency portion processing unit 110H to perform the image adjusting without employing the low-frequency portion processing unit 110L.

In this embodiment, for instance, for the image processing of a pixel unit, the high-frequency portion processing unit 110H and low-frequency portion processing unit 110L equivalently are arranged to respectively and individually perform the corresponding image processing operations upon the image of such pixel unit at first, and then the processed image results are combined to generate the resultant image of the pixel unit so as to obtain the pixel unit's resultant pixel value in the output image such as an output frame or an output picture image. Identically, the above-mentioned operations can be suitable for and applied into the image processing for other pixel units or for all the pixel units.

In addition, in practice, the high-frequency portion processing unit 110H and the low-frequency portion processing unit 110L can be pure hardware circuits, pure software programs, or any combination of hardware circuits and software programs. This is not intended to be a limitation. For example, the high-frequency portion processing unit 110H and the low-frequency portion processing unit 110L can be respectively implemented by using software programs of different algorithms, and a user can choose or decide the curve equation(s) and corresponding parameter value(s) for each of the different algorithms by himself or herself, to determine the whole brightness uniformity and picture details of the resultant output image.

In this embodiment, for a specific pixel unit (e.g. a current pixel unit) in the input image, the high-frequency image portion processing can be arranged to adjust/tune and process the reflectance (or brightness reflectance) of the pixel image of the specific pixel unit, and the low-frequency image portion processing can be arranged to adjust/tune and process the brightness (or average brightness) of the pixel image of the specific pixel unit. For example, the information of image (or pixel value) of the specific pixel unit can be regarded as the mathematical product of the low-frequency information and the high-frequency information of the specific pixel unit and can be indicated by the following equation:

$$val\_org = mean\_org \times \frac{val\_org}{mean\_org}$$

val_org is the image information of the specific pixel unit, e.g. the pixel value, which for example may be at the range of 0~255 or may be at the range of 0~1 if it is normalized, wherein the pixel value 0 for example can be used to indicate a minimum pixel value in the input image or an absolute pixel value 0 while the pixel value 1 may indicate a maximum pixel value in the input image or an absolute pixel value 255. mean_org is the low-frequency information of the specific pixel unit, e.g. a local average brightness, which for example may be at the range of 0~255 or may be at the range of 0~1 if it is indicated by a normalized form, wherein the value 0 may indicate a minimum brightness value in the input image while the value 1 may indicate a maximum brightness value in the input image.

$$\frac{val\_org}{mean\_org}$$

is the high-frequency information of the specific pixel unit, e.g. the image's reflectance, which can be at the range of 0~1 or can be greater than 1. For example, when a current pixel unit is at a white edge in the input image, the value of val_org may be greater than the value of mean_org, and thus the value of $$\frac{val\_org}{mean\_org}$$

may be greater than 1. In addition, in another example, if the current pixel unit is at any light source in the input image, then the reflectance will be greater than 1.

For generating pixel image of the pixel unit in the output image, the image information of the pixel unit in the output image can be also indicated by the mathematical product of low-frequency information and high-frequency information and can be indicated by the following equation:

$$val\_new = mean\_new \times \frac{val\_new}{mean\_new}$$

val_new is a resultant pixel value in the output image, generated by the image processing apparatus 100 performing an image processing upon the pixel unit's pixel value in the input image. mean_new can be regarded as resultant low-frequency information in the output image, generated by the low-frequency portion processing unit 110L performing the low-frequency image portion processing upon the original low-frequency information mean_org of the pixel unit.

$$\frac{val\_new}{mean\_new}$$

can ne regarded as resultant high-frequency information in the output image, generated by the high-frequency portion processing unit 110H performing the high-frequency image portion processing upon the original high-frequency information $$\frac{val\_org}{mean\_org}$$

of the pixel unit. val_new and mean_new can be also indicated by a normalized form, and it is not detailed again for brevity. The value of $$\frac{val\_new}{mean\_new}$$

can be at the range of 0~1 or can be greater than 1.

In one embodiment, after the user determines the curve equation and corresponding parameter value(s) of the algorithm employed by the high-frequency portion processing unit 110H and the curve equation and corresponding parameter value (s) of the algorithm employed by the low-frequency portion processing unit 110L, the image of one or each pixel unit in an input image can be processed based on the selected curve equations and parameter values to generate the image of one or each pixel unit in an output image.

In other embodiment, in order to simplify the computation amount of the curve equations performed based on the different parameter values each time, the processing circuit 110 for example can be arranged to generate multiple corresponding different local average brightness values according to multiple different pixels at first, and then it is arranged to generate multiple output pixel values according to a variety of combinations of the multiple different pixel values and the multiple corresponding different local average brightness values. These values for example can be indicated by the normalized form. A two-dimensional lookup table LUT can be therefore generated based on the combinations of the values and the values of the generated output pixels, and it can be stored into the storage unit 105.

For example, an input pixel's value, local average brightness value, and the generated value of a corresponding output pixel can be respectively indicated by the normalized form, wherein each value may be at the range of 0~1. The range of 0~1 of the value of the input pixel can be equivalently divided into N segments, and the distance width of two ends of each segment may be $$\frac{1}{N},$$

i.e. there exist (N+1) value points comprising two end value points and other division value points. For example, in a simplified scenario (but not limited), if N is equal to 4, then the width of each segment will be 0.25. The choices of five value points may be 0, 0.25, 0.5, 0.75, and 1. The range of 0~1 of the local average brightness value of the input pixel can also be divided into M segments, and the width of each segment may be $$\frac{1}{M},$$

i.e. there exist (M+1) value points comprising two end value points and other division value points. N and M can be an identical value. For example, in an embodiment, N and M can be equal to 32 (but not limited). The processing circuit 110 generates corresponding 33×33 output pixel values according to 33×33 combinations respectively formed by 33 values and 33 local average brightness values. It should be noted that a portion of values in the output pixel values may be identical or similar. This is not intended to be a limitation of the invention.

Therefore, when receiving an incoming new input pixel, the processing circuit 110 can generate a corresponding local average brightness value based on such input pixel and then can do the index look-up and find respective two adjacent value points based on the value of the input pixel and the generated local average brightness value from the above-mentioned two-dimensional lookup table LUT. For example, based on the input pixel, it can find two adjacent value points closest to the value of the input pixel. Based on the local average brightness value, it can also find two adjacent value points closest to the local average brightness value. Accordingly, the processing circuit 110 can find the pixel values of four output pixels corresponding to the four combinations of the found adjacent value points mentioned above, and then it can perform a bilinear interpolation calculation to generate the pixel value of a resultant output pixel according to the pixel value of the input pixel, the generated local average brightness value, the found four value points, and the pixel values of the four output pixels.

Figure 2:
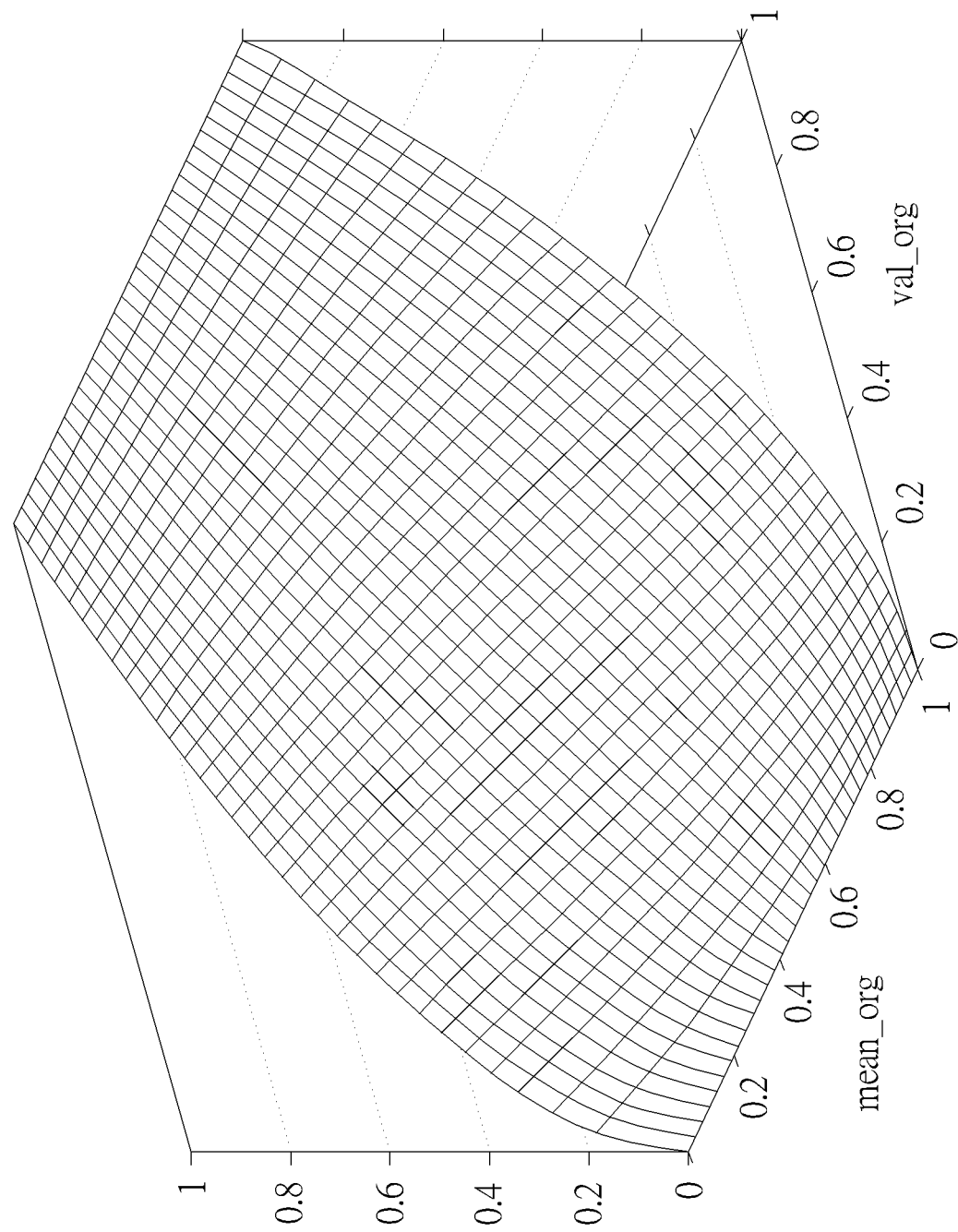
FIG. 2 is a diagram of a 3D model example of a two-dimensional lookup table LUT generated based on the curve equation and corresponding parameter value(s) of the low-frequency portion processing unit and the curve equation and corresponding parameter value(s) of the high-frequency portion processing unit respectively selected by the processing circuit as shown in FIG. 1 according to an embodiment of the invention.
Figure 3:
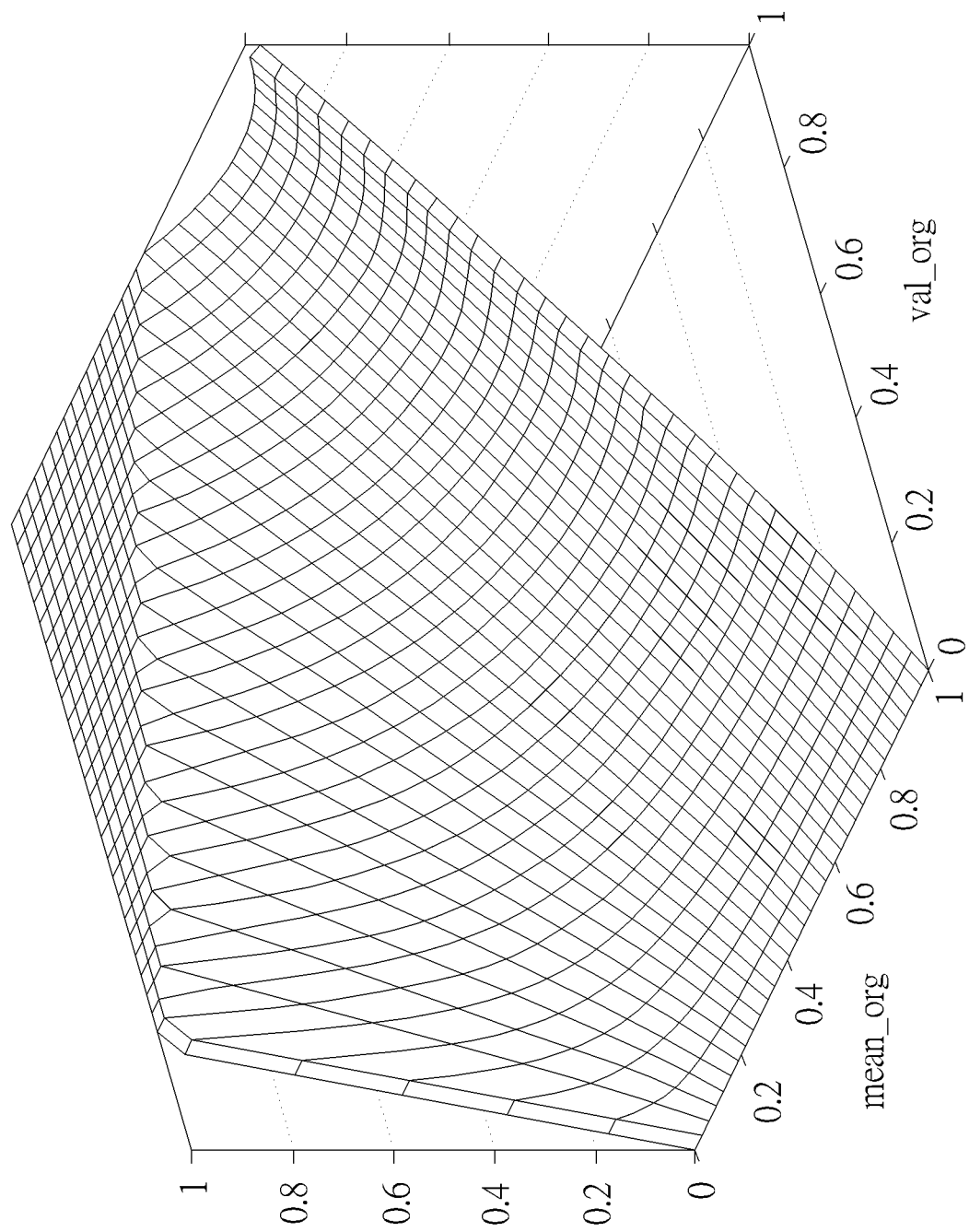
FIG. 3 is a diagram of another 3D model example of another two-dimensional lookup table LUT generated based on the curve equation and corresponding parameter value(s) of the low-frequency portion processing unit and the curve equation and corresponding parameter value(s) of the high-frequency portion processing unit respectively selected by the processing circuit as shown in FIG. 1 according to another embodiment of the invention.
Figure 4:
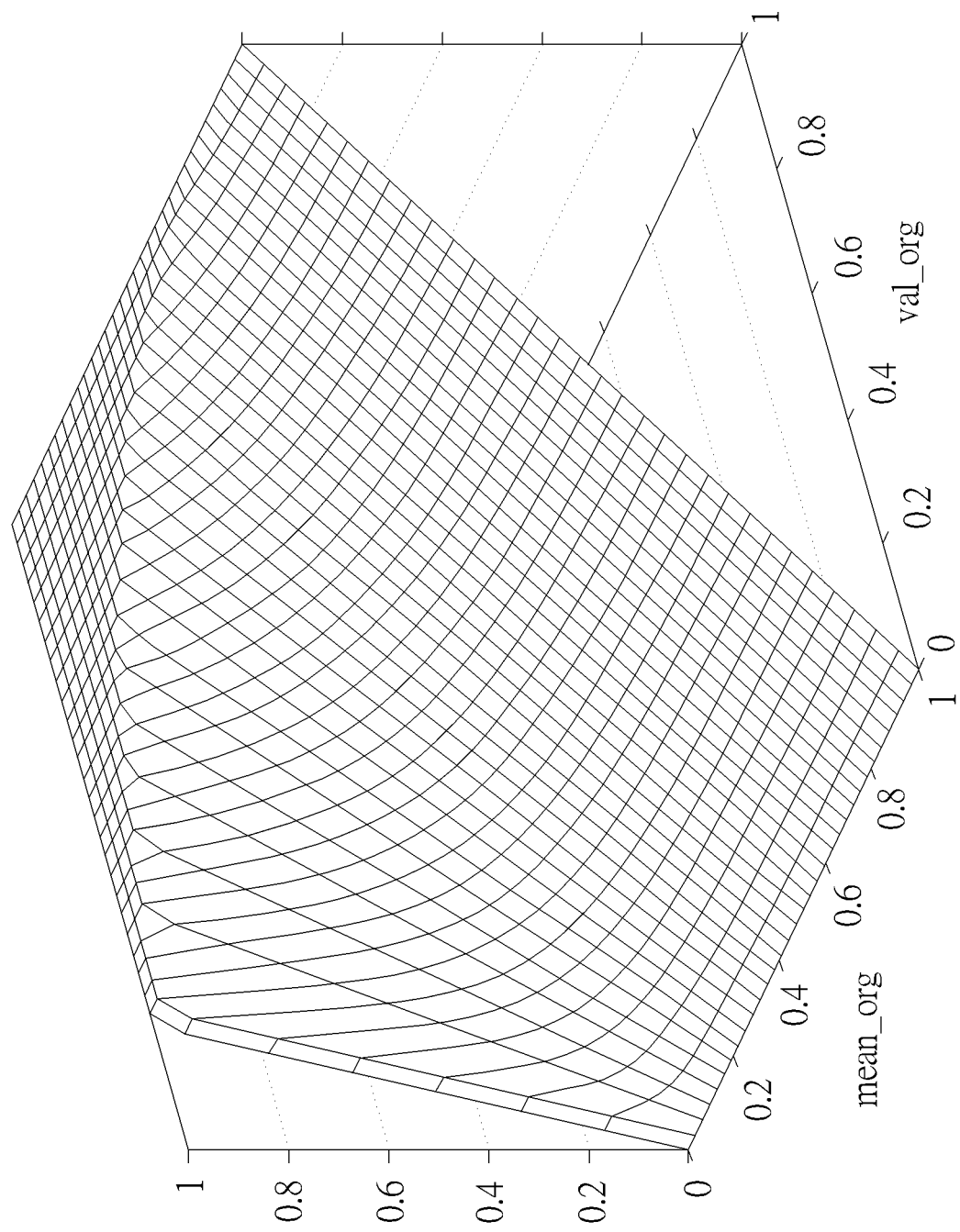
FIG. 4 is a diagram of another 3D model example of another two-dimensional lookup table LUT generated based on a condition that the processing circuit as shown in FIG. 1 has selected the curve equation and corresponding parameter value(s) of the low-frequency portion processing unit and the processing circuit determines not to perform the image adjusting operation of the high-frequency portion processing unit according to another embodiment of the invention.
Figure 5:
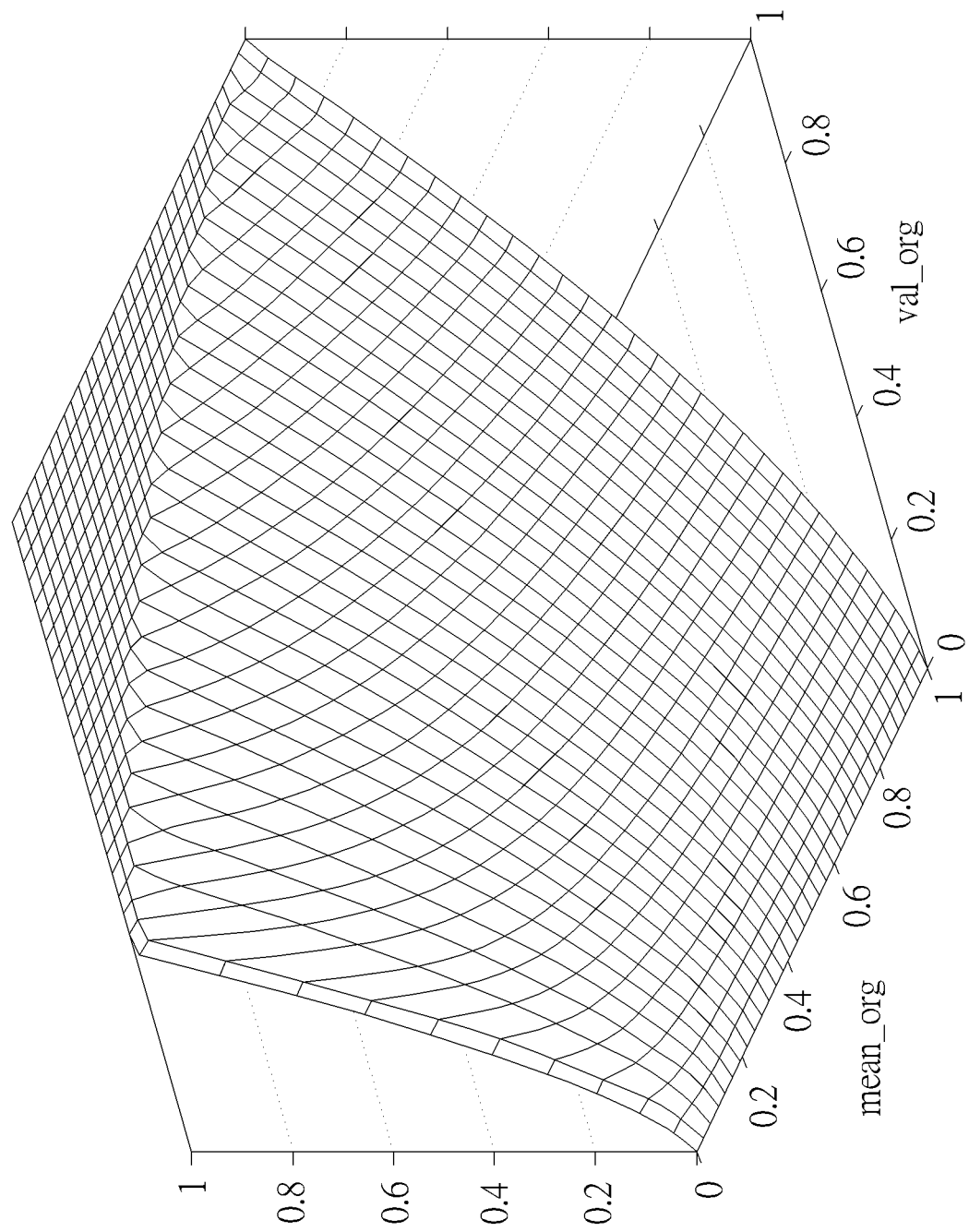
FIG. 5 is a diagram of another 3D model example of another two-dimensional lookup table LUT generated based on a condition that the processing circuit as shown in FIG. 1 has selected the curve equation and corresponding parameter value(s) of the high-frequency portion processing unit and the processing circuit determines not to perform the image adjusting operation of the low-frequency portion processing unit according to another embodiment of the invention.

Please refer to FIG. 2, FIG. 3, FIG. 4, and in conjunction with FIG. 5. FIGS. 2-5 are the examples of different 3D (three-dimensional) models respectively showing the different relations between (N+1) value points associated with the input pixel value mentioned above, (M+1) value points associated with the local average brightness value, and the combinations of (N+1)×(M+1) output pixel values based on the curve equations and parameter values corresponding to the different algorithms employed by the processing circuit 110 according to different embodiments of the invention. The values N and M for example are equal to 32. FIG. 2 is a diagram of a 3D model example of a two-dimensional lookup table LUT generated based on the curve equation and corresponding parameter value(s) of the low-frequency portion processing unit 110L and the curve equation and corresponding parameter value(s) of the high-frequency portion processing unit 110H respectively selected by the processing circuit 110 as shown in FIG. 1 according to an embodiment of the invention. In FIG. 2, the curve equations of the algorithms of the low-frequency portion processing unit 110L and the high-frequency portion processing unit 110H employ the same parameter transformation for the curve equations. The algorithm for example (but not limited) is an algorithm of the local color correction (LCC) scheme. It should be noted that the algorithm of LCC scheme may be arranged to adjust image information of low-frequency portion(s) and high-frequency portion(s) and may use the same adjustments. FIG. 3 is a diagram of another 3D model example of another two-dimensional lookup table LUT generated based on the curve equation and corresponding parameter value(s) of the low-frequency portion processing unit 110L and the curve equation and corresponding parameter value(s) of the high-frequency portion processing unit 110H respectively selected by the processing circuit 110 as shown in FIG. 1 according to another embodiment of the invention. In FIG. 3, the algorithm employed by the low-frequency portion processing unit 110L for example is the algorithm of LCC scheme, and the high-frequency portion processing unit 110H employs an algorithm of a local gamma correction (LGC) operation and the parameter γ for example is configured as 1.1 (but not limited).

FIG. 4 is a diagram of another 3D model example of another two-dimensional lookup table LUT generated based on a condition that the processing circuit 110 as shown in FIG. 1 has selected the curve equation and corresponding parameter value(s) of the low-frequency portion processing unit 110L and the processing circuit 110 determines not to perform the image adjusting operation of the high-frequency portion processing unit 110H according to another embodiment of the invention. In FIG. 4, the algorithm employed by the low-frequency portion processing unit 110L for example is an AINDANE (Adaptive and Integrated Neighborhood-dependent Approach for Nonlinear Enhancement of Color Images) algorithm, and the value of parameter z for example is configured as 0.5 (but not limited).

FIG. 5 is a diagram of another 3D model example of another two-dimensional lookup table LUT generated based on a condition that the processing circuit 110 as shown in FIG. 1 has selected the curve equation and corresponding parameter value(s) of the high-frequency portion processing unit 110H and the processing circuit 110 determines not to perform the image adjusting operation of the low-frequency portion processing unit 110L according to another embodiment of the invention. In FIG. 5, the algorithm employed by the high-frequency portion processing unit 110H for example is an algorithm of the LGC operation, and the value of parameter γ for example is configured as 1.5 (but not limited).

In FIGS. 2-5, each intersection point in each of the models with rectangular meshes indicates the value of a resultant output pixel corresponding to a combination of a value of the above-mentioned input pixel and a corresponding local average brightness value. The models of the two-dimensional lookup tables LUT can be stored in the storage unit 105. Based on the above descriptions, the embodiments of the invention are equivalently to individually and respectively perform the processing of the low-frequency portions and the processing of the high-frequency portions at first and then to integrate the individual results, so as to make the design of the image regulating operations become more flexible. The users can decide or determine the curve equation(s) and corresponding parameter value (s) which are respectively suitable for the high-frequency portion images and the low-frequency portion images based on their requirements, to regulate the brightness and adjust picture details.

For the operation of low-frequency portion processing unit 110L, in one embodiment, the low-frequency portion processing unit 110L can employ an algorithm for enhancing the partial image contrast, e.g. the algorithm of the local color correction scheme, to process the low-frequency portion of the image of a specific pixel unit. For example, for a 8-bit width RGB image in which the pixel values of red (R), green (G), and blue (B) colors are at the range of 0~255, if the brightness (or intensity) is considered to avoid saturation loss, the brightness of the image of the specific pixel unit can be the average value of the image brightness on its three R, G, and B color channels and for example can be indicated by the following equation:

$$I(x, y) = \frac{R(x, y) + G(x, y) + B(x, y)}{3}$$

Parameter (x,y) is the pixel coordinate point of the image of the specific pixel unit in an input image. I(x,y) is the brightness value of the image of the specific pixel unit. R(x,y), G(x,y), and B(x,y) are the image brightness values of the specific pixel unit respectively corresponding to the three different color channels. The local color correction scheme then is arranged to perform a Gaussian blur operation upon the image of the specific pixel unit to compute the mask image which can be indicated by the following equation:

$$M(x,y)=(\text{Gaussian}*(255-I))(x,y)$$

The local color correction scheme can invert the brightness value of the image, then perform Gaussian blur operation/calculation upon the inverted brightness value of the image to obtain M(x,y), and then use M(x,y) to perform a gamma correction upon the input pixel of the specific pixel unit to generate low-frequency portion image information Output(x,y) of the specific pixel unit in the output image. The low-frequency portion image information Output(x,y) can be indicated by the following equation:

$$Output\ (x,\ y) = 255\left(\frac{Input\ (x,\ y)}{255}\right)^{2^{\frac{128-M(x,y)}{128}}}$$

The above equation can be simplified into a normalized form which can be indicated by the following equations:

$$M'(x,y) = (Gaussian * I)(x,y)$$

$$Output(x,y) = (Input(x,y))^{2^{2M'(x,y)-1}}$$

Input(x,y) is the brightness value of the input pixel unit at the pixel coordinate point (x,y). Output(x,y) is the brightness value of the adjusted output pixel unit at the pixel coordinate point (x,y). M'(x,y) can be regarded as a local average brightness value of the input pixel unit. For the local color correction scheme, when the image of the specific pixel unit is in a darker region of the image, the brightness value I(x,y) is smaller, and the value of (255−I(x,y)) is larger. The value of (255−I(x,y)) after being processed by the Gaussian blur operation is still comparatively larger. In this situation, there is a great probability that the value of M(x,y) becomes greater than half of the brightness value, i.e. 128. In this situation, the parameter value of the gamma correction becomes smaller than 1, so that the image at the darker region will be processed by the gamma correction with the parameter γ being smaller than 1. The gamma correction with the parameter γ being smaller than 1 corresponds to a concave down curve with the positive slope gradually decreasing, and the image at the darker region may be brightened accordingly. Additionally, when the image of the specific pixel unit is in a brighter region of the image, the brightness value I(x,y) is larger, and the value of (255−I(x,y)) is smaller. The value of (255−I(x,y)) after being processed by the Gaussian blur operation is still comparatively smaller. In this situation, there is a great probability that the value of M(x,y) becomes smaller than half of the brightness value, i.e. 128. In this situation, the parameter value of the gamma correction becomes greater than 1, so that the image at the brighter region will be processed by the gamma correction with the parameter γ being greater than 1. The gamma correction with the parameter γ being greater than 1 corresponds to a concave up curve with the positive slope gradually increasing, and the image at the brighter region may be darkened accordingly.

In addition, in order to more flexibly adjust the image details, in practice, in addition to using the above-mentioned principles, the low-frequency portion processing unit 110L further uses an FCSCM (Fast Centre-surround Contrast Modification) operation to adjust the output image by considering the relation between the image of the centre object (i.e. the pixel unit) and the image(s) of neighboring pixel unit(s). For example, the information of the neighboring images of the current pixel unit may be regarded as the local average brightness information. When the brightness of the neighboring images is darker, a concave down curve with the positive slope gradually decreasing will be referenced to increase the contrast of the current image compared to the neighboring images at a darker object. When the brightness of the neighboring images is brighter, a concave up curve with the positive slope gradually increasing will be referenced to increase the contrast of the current image compared to the neighboring images at a brighter object. It should be noted that the FCSCM operation is not limited to only adjust the low-frequency information of the image, and it also partially adjusts the high-frequency information of the image. In this embodiment, taking the above-mentioned normalized image as an example, the low-frequency portion processing unit 110L is arranged to respectively regard the brightness value Input(x,y) and local average brightness value M'(x,y) of the current pixel unit in the above-mentioned local color correction scheme operation as the centre information and the neighboring information of the FCSCM operation. The curve equation can be indicated by the following equation:

$$val\_new = val\_org^{2^{2 \cdot mean\_org - 1}}$$

mean_org is the local average brightness of the image of the specific pixel unit. Please refer to FIG. 2 again. In the model of FIG. 2, the processing circuit 110 determines that its low-frequency portion processing unit 110L employs the curve equation of the local color correction scheme algorithm. That is, val_org in the above paragraph is regarded as mean_org, and val_new is regarded as mean_new. The following equation is obtained:

$$mean\_new = mean\_org^{2^{2 \cdot mean\_org - 1}}.$$

Figure 6:
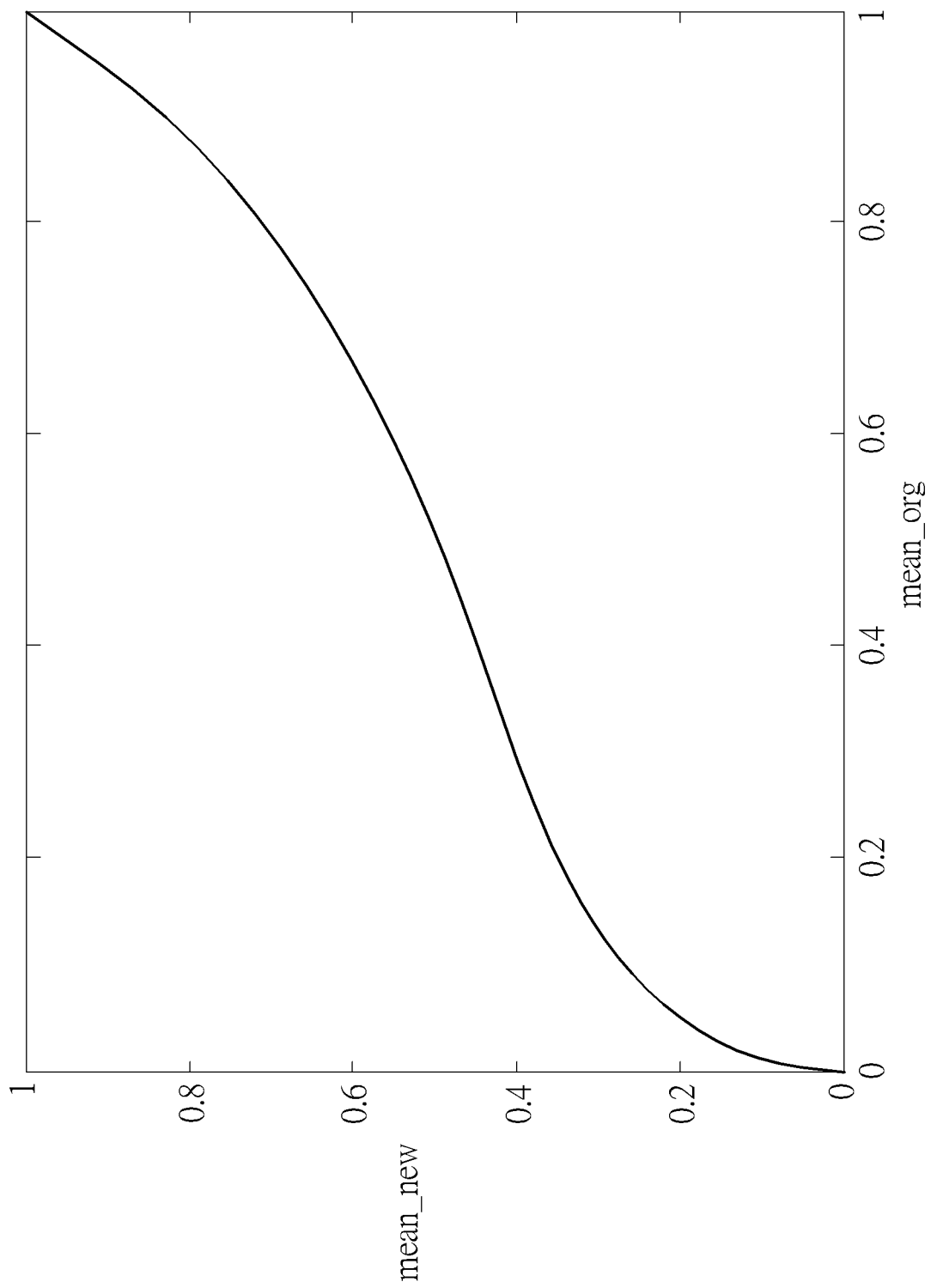
FIG. 6 is a diagram of an inverse S-curve corresponding to the above-mentioned equation according to an embodiment of the invention.

This is the curve equation corresponding to the diagonal curve in FIG. 2, i.e. the curve in FIG. 6.

Figure 11:
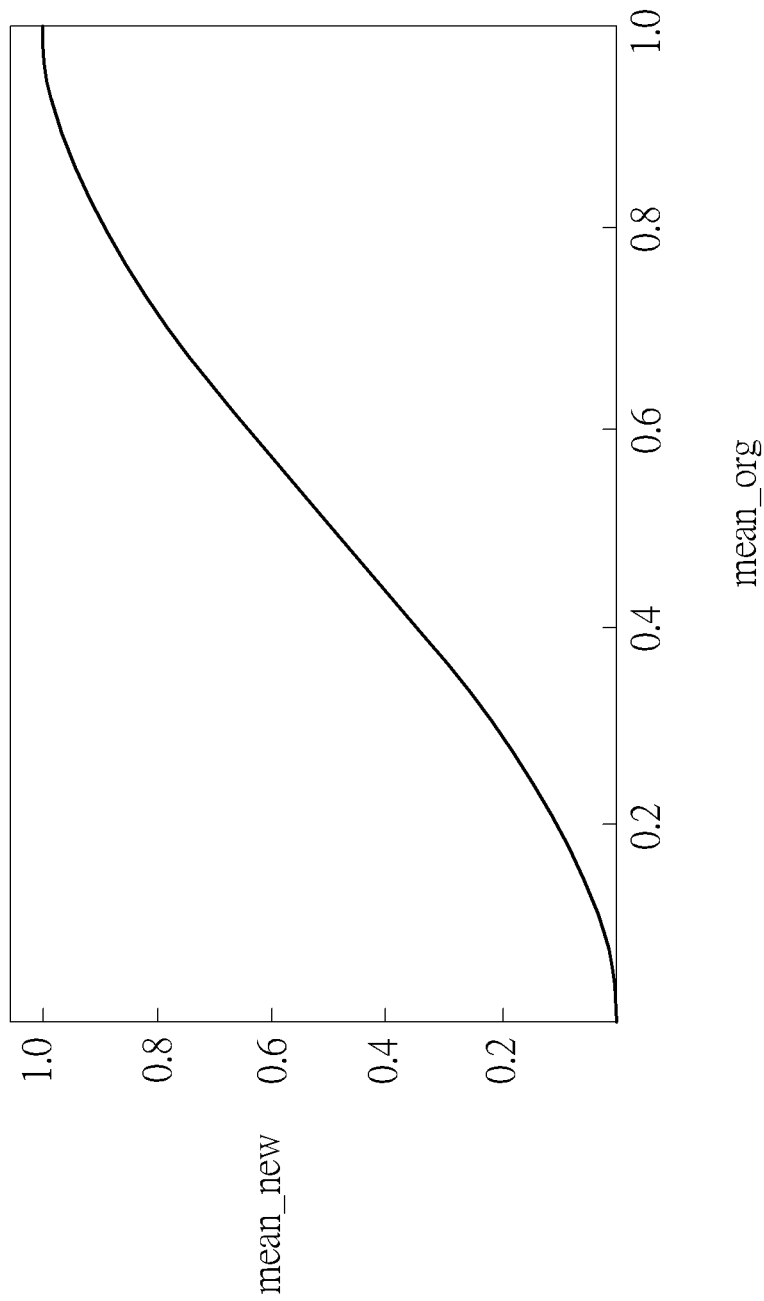
FIG. 11 is a diagram of an S-curve corresponding to the above-mentioned equation according to an embodiment of the invention.

Please refer to FIG. 6. FIG. 6 is a diagram of an inverse S-curve corresponding to the above-mentioned equation according to an embodiment of the invention. The horizontal axis shows the values of mean_org, normalized into the range 0~1, for the inverse S-curve. The vertical axis shows the values of mean_new, normalized into the range 0~1, for the inverse S-curve. For example, the low-frequency portion processing unit 110L is arranged to adjust the brightness of the whole region in the input image according to the inverse S-curve. For instance, in different conditions such as a condition that the value of mean_org is close to zero (i.e. darkest) and a condition that the value of mean_org is close to 1 (i.e. brightest), the low-frequency portion processing unit 110L employs different curve portions to adjust the contrast of the brightness. When the value of mean_org is close to 0.5 (i.e. the middle brightness), in this situation the value of mean_new can be approximated to or identical to the value of mean_org. It is almost not arranged to perform brightness regulation. Further, it should be noted that the example of the inverse S-curve is not intended to be a limitation of the invention. In other embodiment, other examples of curves having different shapes such as an S-curve can be used. Refer to FIG. 11. FIG. 11 is a diagram of an S-curve corresponding to the above-mentioned equation according to an embodiment of the invention. The example of S-curve is implemented by using the Smoothstep curve and can be implemented by using the following equation:

$$mean\_new = 3 \cdot mean\_org^2 - 2 \cdot mean\_org^3.$$

For example, the low-frequency portion processing unit 110L in practice is arranged to employ the inverse S-curve in FIG. 6 to calculate and obtain the value of mean_new by using the value mean_org based on the equation indicated by the inverse S-curve.

In addition, in other embodiment, for image regulation, in practice, the low-frequency portion processing unit 110L can employ equations of other algorithms for implementation.

Figure 7:
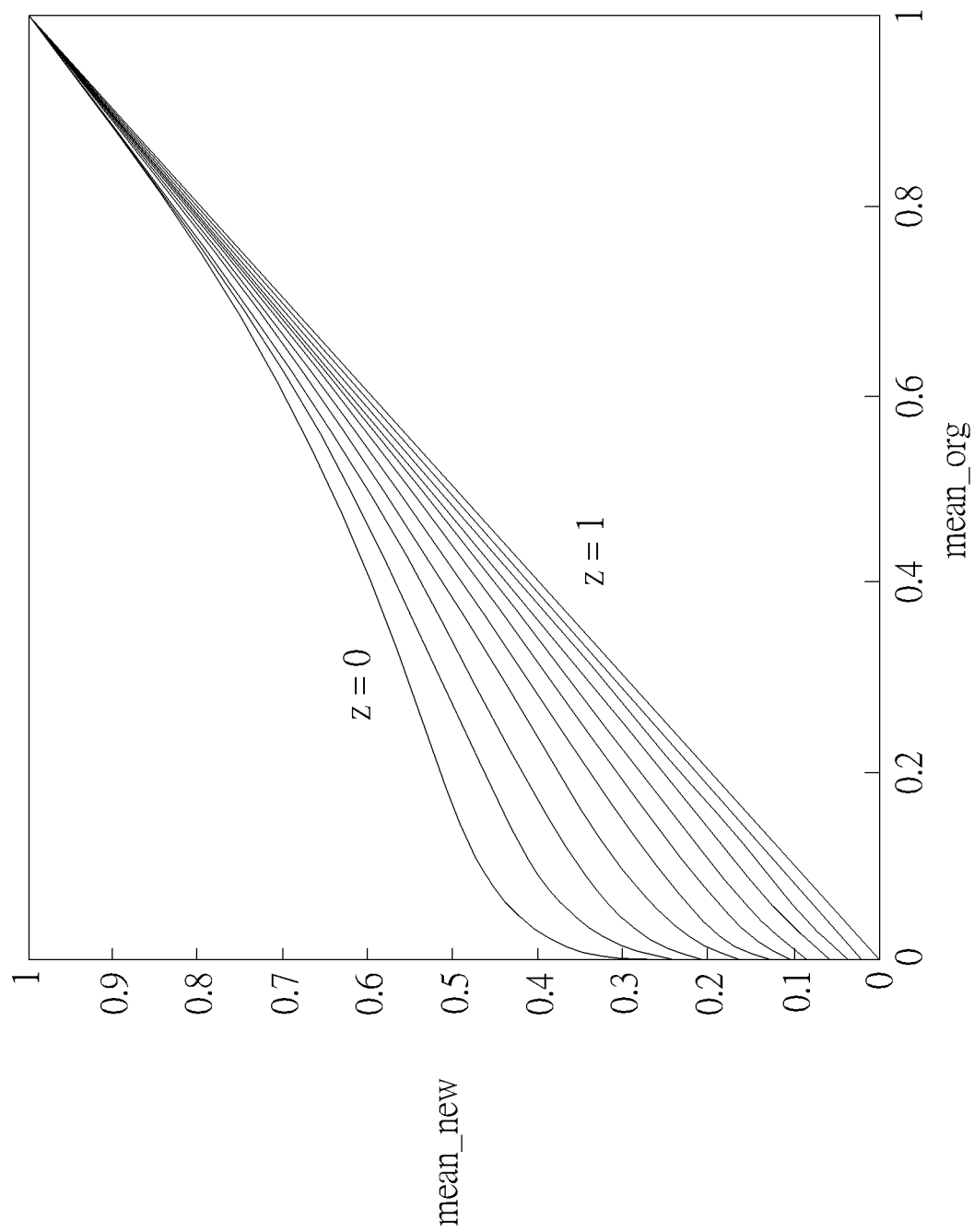
FIG. 7 is a diagram of an example of using a curve equation corresponding to the AINDANE algorithm to calculate and generate the value of mean_new according to an embodiment of the invention.

For example (but not limited), the low-frequency portion processing unit 110L can employ a curve equation corresponding to the AINDANE algorithm to calculate and generate the value of mean_new. FIG. 7 is a diagram of an example of using a curve equation corresponding to the AINDANE algorithm to calculate and generate the value of mean_new according to an embodiment of the invention. The AINDANE algorithm comprises a parameter z, and the value of parameter z can be in the range of 0~1. For example (but not limited), the value of parameter z can be configured as 0.5 for implementation.

In addition, in other embodiment, the low-frequency portion processing unit 110L can be arranged to not perform image regulation. In this situation, the values of local average brightness of all the pixel units, i.e. the values of mean_org, can be used as the values of mean_new, i.e. mean_new=mean_org.

For the image processing of the high-frequency portion, the high-frequency portion processing unit 110H for example employs a local gamma correction operation and performs the image regulation according to the following equation:

$$\frac{\text{val\_new}}{\text{mean\_new}} = \left(\frac{\text{val\_org}}{\text{mean\_org}}\right)^\gamma$$

val_org is the input pixel value of the specific pixel unit in the input image. γ is an adjustable parameter. In log domain, it can be seen that the adjustable parameter γ can be used to stretch and enlarge the contrast between the pixel value of the centre pixel unit and the pixel value of the neighboring pixel unit, and it can be indicated by the following equation:

log(val_new)−log(mean_new)=γ·(log(val_org)−log(mean_org)).

Therefore, the image processing apparatus 100 can combine the adjusted low-frequency portion with the adjusted high-frequency portion to regenerate the following equation:

$$\text{val\_new} = \\ \text{mean\_new} \times \frac{\text{val\_new}}{\text{mean\_new}} = \text{mean\_org}^{2\text{-mean\_org}-1} \times \left(\frac{\text{val\_org}}{\text{mean\_org}}\right)^\gamma.$$

According to the operations of the above two-dimensional lookup table LUT, for example, the image processing apparatus 100 can generate and build 33 curves in which each curve's parameter γ is adjustable. The information or values can be stored in the storage unit 105. It should be noted that the example of local gamma correction is not intended to be a limitation of the invention. In other embodiment, the high-frequency portion processing unit 110H may employ other curve equations to achieve the regulation of image details, e.g. using the equation of an S-curve.

Further, in other embodiment, the high-frequency portion processing unit 110H can be arranged to not perform the image regulation, and the values of reflectance $$\frac{\text{val\_org}}{\text{mean\_org}}$$

of all the pixel units can be used as the values of $$\frac{\text{val\_new}}{\text{mean\_new}},$$

i.e.

$$\frac{\text{val\_new}}{\text{mean\_new}} = \frac{\text{val\_org}}{\text{mean\_org}}.$$

Further, in other embodiment, the image processing apparatus 100 may combine the adjusted low-frequency portion with the adjusted high-frequency portion to regenerate the following equation:

val_new=min(max(m·(val_org−mean_org)+mean_new,0),1))

where the parameter m is an adjustable slope. When the value of mean_org is in the range of 0~1, i.e. 0<mean_org<1, there exists the following inequality relation:

$$m > \max\left(\frac{\text{mean\_new}}{\text{mean\_org}}, \frac{1 - \text{mean\_new}}{1 - \text{mean\_org}}\right).$$

When the value of mean_org is equal to 0 or equal to 1, there exists the following inequality relation:

m>1.

Figure 10:
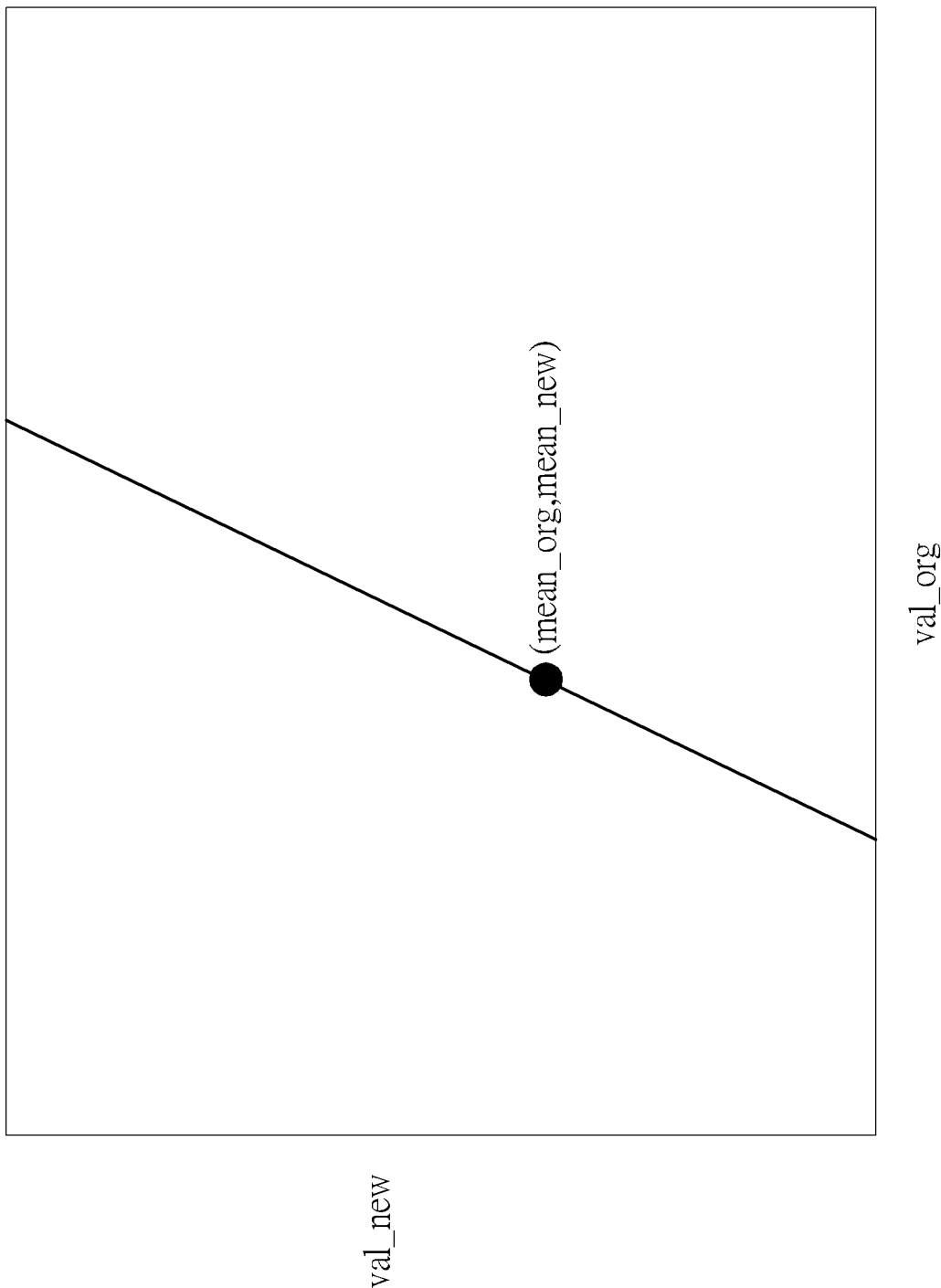
FIG. 10 is a diagram of an example implemented by using a line graph to indicate the S-curve passing through a specific fixed point according to an embodiment of the invention.

The above relation shows a line graph shown in FIG. 10. FIG. 10 is a diagram of an example implemented by using a line graph to indicate the S-curve passing through a specific fixed point. This is not intended to be a limitation of the invention.

Figure 8:
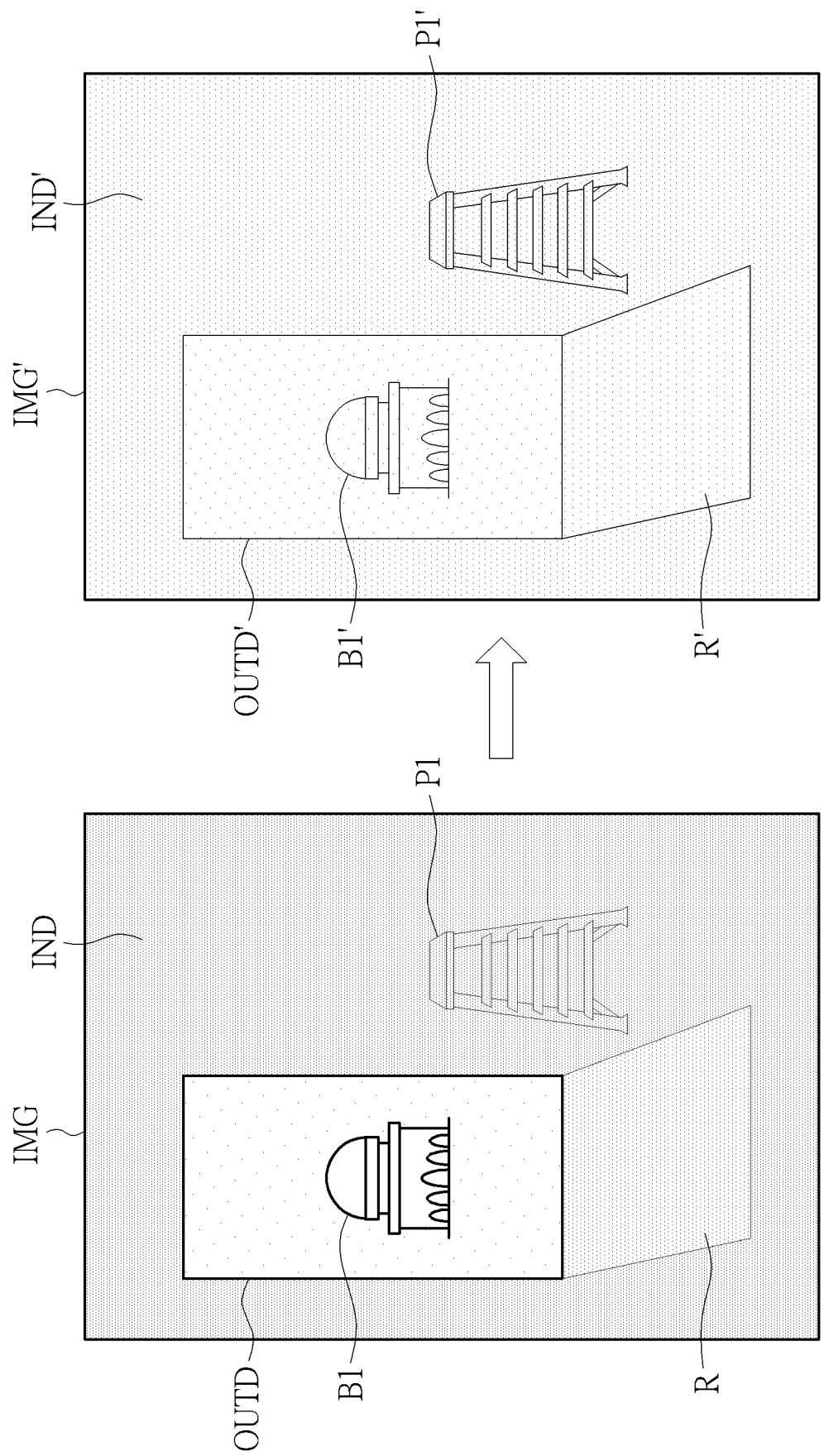
FIG. 8 is a diagram showing an original input image and an output image generated by using the curve equations based on the same parameter transformation to process the low-frequency image portion and high-frequency image portion (i.e. the high-frequency image processing does not adopt other parameters) according to an embodiment of the invention.
Figure 9:
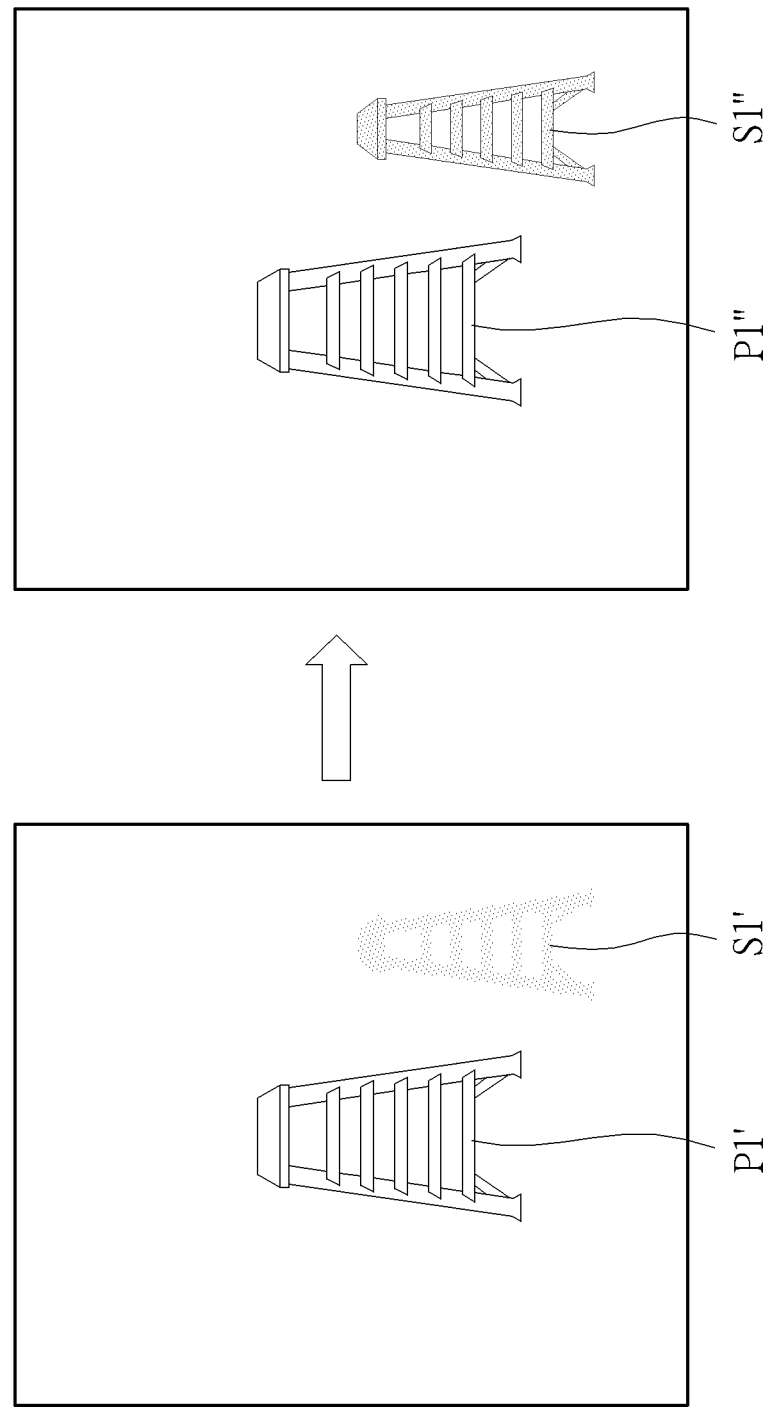
FIG. 9 is a diagram showing a comparison between the example of the high-frequency image portion regulating operation performing an image regulation without using parameters of other ranges and the example of the high-frequency image portion regulating operation performing an image regulation with using parameters of other ranges according to an embodiment of the invention.

To make readers more clearly understand the spirits of the invention, FIG. 8 and FIG. 9 are provided. FIG. 8 is a diagram showing a comparison of an original input image and an output image generated by using the curve equations based on the same parameter transformation to process the low-frequency image portion and high-frequency image portion (i.e. the high-frequency image processing does not adopt other parameters) according to an embodiment of the invention. As shown in the left side of FIG. 8, the original input image IMG for example is an image with significantly uneven brightness. For instance, the whole input image IMG may comprise an image portion OUTD associated with an outdoor image outside a window and an image portion IND associated with an indoor image covering the rest regions. The outdoor image portion OUTD for example may comprise a building B1, and the indoor image portion IND may comprise a ladder image P1. For example (but not limited), the original input image IMG may be captured in a condition that the outdoor space is full of daylight while no lights are turned on in the indoor dark space; that is, the outdoor image portion OUTD displays a daytime scene full of daylight. The brightness of the image in the region of the building B1 in the outdoor image portion OUTD for example may be too bright, and the brightness of the image in the region of the ladder P1 in the indoor image portion IND for example may be too dark. In FIG. 8, the density of dots is used to indicate the differences of brightness. The dots with the higher density are associated with a darker image. The image of building B1 having no dots may be the brightest image, and the other images in the outdoor image portion OUTD may be the second brightest images. For the indoor image portion IND, the region R, exposed to the light outside the window, may have the second darkest image, and the brightness of the image of the other regions is the darkest. As shown in the right side of FIG. 8, in an output image IMG' generated after processing the low-frequency portion image of the original input image IMG, for example, the brightness of the outdoor image portion OUTD is dimmed or darkened, and the brightness of the indoor image portion IND is brightened, as shown by the density of the dots in FIG. 8. B1', R', OUTD', IND', and P1' are images which are respectively generated by processing the images B1, R, OUTD, IND, and P1. FIG. 9 is a diagram showing a comparison between the example of the high-frequency image portion regulating operation performing an image regulation without using parameters of other ranges and the example of the high-frequency image portion regulating operation performing an image regulation with using parameters of other ranges according to an embodiment of the invention. As shown in the left side of FIG. 9, the shadow image S1' corresponding to the ladder image P1' is blurry. As shown in the right side of FIG. 9, the result of image regulation is the result of performing high-frequency and low-frequency image portion regulations at the same time, and the shadow image S1" corresponding to the ladder image P1" is clear and its edge is sharp, that is, the image details are improved. In the embodiments of the invention, this can also greatly improve the image details of lines such as grids or railings in the picture when adjusting the brightness of bright and dark regions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing apparatus, comprising:
   a processing circuit, for receiving an input image, and comprising:
      a high-frequency portion processing unit being a high-frequency portion processing circuit, for performing a high-frequency image portion regulating operation to improve image details of an image of an at least one pixel unit of the input image according to high-frequency information of the image of the at least one pixel unit; and
      a low-frequency portion processing unit being a low-frequency portion processing circuit, for performing a low-frequency image portion regulating operation to regulate local brightness of an image of an at least one pixel unit of the input image according to low-frequency information of the image of the at least one pixel unit;
      wherein the processing circuit generates an output image according to the input image, the low-frequency image portion regulating operation, and the high-frequency image portion regulating operation; the low-frequency information corresponds to the local brightness value of the image of the at least one pixel unit; the local brightness value is an average brightness value generated by the image of the at least one pixel unit and the image(s) of neighboring pixel unit(s); and, a curve equation employed by the low-frequency portion processing unit is a curve equation of the Smooth step algorithm based on a following equation:

$$\text{mean\_new} = \alpha \cdot \text{mean\_org}^\beta \cdot \text{mean\_org}^\alpha;$$

mean_org is a local average brightness of the image of the at least one pixel unit and is used as an original low-frequency information of the at least pixel unit; and, mean_new is a resultant low-frequency information in the output image generated by the low-frequency portion processing unit performing the low-frequency image portion regulating operation upon the original low-frequency information mean_org.

2. The image processing apparatus of claim 1, wherein the high-frequency information corresponds to the image reflectance of the image of the at least one pixel unit; and, a curve equation employed by the high-frequency portion processing unit is a curve equation of an algorithm of a local gamma correction operation or a S-curve curve equation; the parameter γ of the local gamma correction operation is adjustable.

3. The image processing apparatus of claim 1, further comprising:
   a storage unit;
   wherein the processing circuit is arranged to divide a pixel value range of the image of the at least one pixel unit into N segments, to divide a local brightness value range of the image of the at least one pixel unit into M segments, and to generate (N+1)×(M+1) output pixel values to generate a two-dimensional lookup table according to (N+1) value points of the N segments, (M+1) value points of the M segments, a curve equation and a corresponding high-frequency parameter value employed by the high-frequency portion processing unit, and another curve equation and a corresponding low-frequency parameter value employed by the low-frequency portion processing unit; and, the two-dimensional lookup table is stored in the storage unit.

4. The image processing apparatus of claim 1, wherein when receiving an incoming input pixel, the processing circuit is arranged to generate a local brightness value corresponding to the incoming input pixel, find and obtain a plurality of value points from the two-dimensional lookup table according to a value of the incoming input pixel, and the local brightness value of the incoming input pixel, and then to perform a bilinear interpolation operation to generate an output pixel value according to the value of the incoming input pixel, the local brightness value of the incoming input pixel, and the value points.

5. An image processing method, comprising:
   receiving an input image;
   using a high-frequency portion processing unit to perform a high-frequency image portion regulating operation to improve image details of an image of an at least one pixel unit of the input image according to high-frequency information of the image of the at least one pixel unit, the high-frequency portion processing unit being a high-frequency portion processing circuit;
   using a low-frequency portion processing unit to perform a low-frequency image portion regulating operation to regulate local brightness of an image of an at least one pixel unit of the input image according to low-frequency information of the image of the at least one pixel unit, the low-frequency portion processing unit being a low-frequency portion processing circuit; and
   generating an output image according to the input image, the low-frequency image portion regulating operation, and the high-frequency image portion regulating operation;
   wherein the low-frequency information corresponds to the local brightness value of the image of the at least one pixel unit; the local brightness value is an average brightness value generated by the image of the at least one pixel unit and the image(s) of neighboring pixel unit(s); and, a curve equation employed by the low-frequency portion processing unit is a curve equation of the Smooth step algorithm based on a following equation:

$$\text{mean\_new} = \alpha \cdot \text{mean\_org}^\beta - \beta \cdot \text{mean\_org}^\alpha;$$

mean_org is a local average brightness of the image of the at least one pixel unit and is used as an original low-frequency information of the at least pixel unit; and, mean_new is a resultant low-frequency information in the output image generated by the low-frequency portion processing unit performing the low-frequency image portion regulating operation upon the original low-frequency information mean_org.

6. The image processing method of claim 5, wherein the high-frequency information corresponds to the image reflectance of the image of the at least one pixel unit; and, a curve equation employed by the high-frequency portion processing unit is a curve equation of an algorithm of a local gamma correction operation or a S-curve curve equation; the parameter $\gamma$ of the local gamma correction operation is adjustable.

7. The image processing method of claim 5, further comprising:
   providing a storage unit;
   dividing a pixel value range of the image of the at least one pixel unit into N segments;
   dividing a local brightness value range of the image of the at least one pixel unit into M segments;
   generating (N+1)×(M+1) output pixel values to generate a two-dimensional lookup table according to (N+1) value points of the N segments, (M+1) value points of the M segments, a curve equation and a corresponding high-frequency parameter value employed by the high-frequency portion processing unit, and another curve equation and a corresponding low-frequency parameter value employed by the low-frequency portion processing unit; and
   storing the two-dimensional lookup table in the storage unit.

8. The image processing method of claim 5, further comprising:
   when receiving an incoming input pixel, generating a local brightness value corresponding to the incoming input pixel, finding and obtaining a plurality of value points from the two-dimensional lookup table according to a value of the incoming input pixel, and the local brightness value of the incoming input pixel, and then performing a bilinear interpolation operation to generate an output pixel value according to the value of the incoming input pixel, the local brightness value of the incoming input pixel, and the value points.

* * * * *